US006289394B1

(12) United States Patent
Kozuka

(10) Patent No.: US 6,289,394 B1
(45) Date of Patent: Sep. 11, 2001

(54) AGENT MANAGEMENT SYSTEM CAPABLE OF READILY MONITORING AND CONTROLLING AGENT

(75) Inventor: Hiroshi Kozuka, Kamakura (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/390,645

(22) Filed: Feb. 17, 1995

(30) Foreign Application Priority Data

Mar. 4, 1994 (JP) .................................................. 6-034938

(51) Int. Cl.⁷ ....................................................... G06F 9/44
(52) U.S. Cl. .............................................................. 709/317
(58) Field of Search ..................................... 395/700, 680, 395/683, 200.55; 709/300, 303, 310–332

(56) References Cited

U.S. PATENT DOCUMENTS

| 5,392,390 | * | 2/1995 | Crozier ................................. | 345/335 |
| 5,434,975 | * | 7/1995 | Allen .................................... | 709/312 |
| 5,475,843 | * | 12/1995 | Halviatti ............................... | 395/700 |
| 5,493,668 | * | 2/1996 | Elko ..................................... | 395/457 |
| 5,504,906 | * | 4/1996 | Lutoff .................................. | 395/700 |
| 5,522,044 | * | 5/1996 | Pascucci .............................. | 395/200 |
| 5,546,594 | * | 8/1996 | Wazumi ............................... | 709/317 |
| 5,560,008 | * | 9/1996 | Johnson et al. ....................... | 713/201 |
| 5,625,821 | * | 4/1997 | Record et al. ........................ | 709/100 |
| 5,778,225 | * | 7/1998 | Supernaw-Issen et al. ......... | 709/303 |

FOREIGN PATENT DOCUMENTS

| 3255556 | 11/1991 | (JP) | ................................ G06F/15/16 |
| 5346910 | 12/1993 | (JP) | ................................ G06F/15/16 |

OTHER PUBLICATIONS

Adhikari, Richard, "MIS Anxious for Systems to tie Knot," Jun., 1994, Software Magazine 614, n6, p78(6).*
Dannenberg, Hibbard, Carnegie–Mellon—ACM Transactions,"A Butler Process for Resource Sharing on Spice Machines" Jul. 1985.*
A Butler Process For Resource Sharing on Spice Machines, Roger Dannenberg & Peter Hibbard, ACM Transactions on Office Information System, vol. 3, No. 3, Jul. 1985.*
Palaniappan et al, The Envoy Framework: An Open Architecture for Agents, ACM Transaction on Information Systems, vol. 10, No. 3, p. 233–264, Jul. 3, 1992.*
Cheriton et al, Distributed Process Groups in the V Kernel, ACM Transactions on Computer Systems, May 1985, p. 77–107.*

* cited by examiner

Primary Examiner—St. John Courtenay, III

(57) ABSTRACT

An agent managing system which enables a user to readily control, from outside, internal information of an agent performing autonomous coordinating operations. The system comprises a program for requesting monitoring and controlling of the agent from outside, and a program for interchanging the necessary information to/from the agent in accordance with the request from the program. As a result, while the agent can independently carry out the autonomous coordinating process as the conventional system, it also becomes possible to control the internal information of the agent securely and flexibly from outside.

12 Claims, 13 Drawing Sheets

AGENT MANAGEMENT SYSTEM CAPABLE OF READILY MONITORING AND CONTROLLING AGENT

BACKGROUND OF THE INVENTION

1. Field of the Invention

The present invention relates to an agent management system, and more particularly to a system for monitoring and controlling an agent from its external environment, in a distributed processing system comprising a single computer or a plurality of computers inter-connected through a workstation and agents being application objects for autonomously operating thereon, and also to a system for constituting the agents to operate in such a manner.

2. Description of the Related Art

FIG. 1 of the accompanying drawings shows a composition of an application coordinating operation system described in Japanese Patent Application No. Hei 4-192112 filed by the present applicant. In FIG. 1, the numerals designate respectively: 65, a process-request input means; 66, a process-request accept means for accepting a process request from the process request input means 65; 71, an application coordinating operation environment which is composed of an environmental information monitoring means 67 for monitoring environmental information based on the process request from the processing request receiving means 66, coordinating operation environmental state information 68, and an environmental state information access means operating based on the application program 70; 72, a processed results output means for outputting a processed result of the environmental information monitoring means 67 in the application coordinating operation environment 71.

In the aforementioned composition, the application coordinating operation environment 71 monitors the environmental information using the environmental state information access means 69, the coordinating operation environmental state information 68 and the environmental information monitoring means 67 in accordance with the plurality of application programs 70 on the basis of the process request having been input from the process request input means 65 to the process request accept means 66, and outputs the processed results to the processed results output means 72.

In this application coordinating operation system, since a plurality of application programs 70 can actively function, it is possible to obtain desired processed results just by issuing process requests from the process-request input means 65 without requiring the system user to clearly indicate the names and positions of a plurality of applications to be used, the starting order of the applications, or data transference relationship among the applications.

FIG. 2 is a conceptual view of a conventional method for encapsulating applications shown in FIG. [2.1] of "Tools-Unifying Method in Software Developing Environment "Soft Beech/Encapsulator in UNIX"" (published by Yokogawa Hewlett Packard Co., Ltd. in July 1992).

As shown in FIG. 2, a window-based interface is accommodated at a portion where a standard input "stdin" and a standard output "stdout" are mutually communicated like in a pipeline, and are encapsulated.

This conventional encapsulating method is based on a so-called pipeline model in which an existing application program in the UNIX operating system reads out data from the standard input "stdin" and writes through the standard output "stdout" and a not shown standard error "stderr". In such a state, according to this method, the user can input and output instructions to the application (command of the UNIX) through the window-based interface i.e. a graphical user interface (GUI) without needing to change the source code of the application. This process is called encapsulation.

On the other hand, FIG. 3 shows a system diagram showing a conventional method for encapsulating applications described in "A Framework "SoftBench" Having Realized Inter-tools Unification" (published by Yokogawa Hewlett Packard Co., Ltd. in September 1992). This is a specific example of the concept shown in FIG. 2. In FIG. 3, the numerals designate respectively: 73, an operating system including signal processing 74; 75, a system call; 76, a BMS (Broadcast Message Server); 77, an event handler; 78, a system event trap; 79, a message event trap; 80, a program capable of being executed by an existing application; 81, an application event trap; 82, a user event trap; 83, an X server; 84, a human interface including a display terminal 85; 86, a standard input (Stdin); 87, a standard output (Stdout) and a standard error output (stderr); and 88, an EDL (Enclosing-type encapsulating program: Encapsulator describing language).

In the aforementioned composition, when the existing application 80 follows a pipeline model, a GUI object suitable for the input/output form of the data to/from the application is set. The EDL 88 is used to describe the event handler 77 in order to connect the input/output data patterns to the GUI object. The event handler 77 newly provides a GUI object being displayed on the X server 83 of the display terminal 85 presenting the human interface 84, and the user event trap 82 in the event handler 77 receives the event generated by the GUI object. The corresponding data defined in the event handler 77 are then input to the existing application 80 through the standard input 86.

The output from the existing application 80 is transferred to the application event trap 81 via the standard output and standard error output 87, and is also displayed on the screen of the display terminal 85 through the X server 83 to be viewed by the user.

It is also possible to describe: the issuance of the system call 75; processing of the signal from the operating system 73; or the communicating operation with the BMS 76; in the event handler 77.

The signal processing 74 is accepted by the system event trap 78 and is then processed in the event handler 77. The BMS 76 controls the broadcasting of the message between other applications. The message event trap 79 receives the message from the BMS 76, and cooperation with other applications can thus be indirectly realized. These series of processes are described as an encapsulated program in the form of the event handler 77 by use of the EDL 88.

This encapsulating program is processed in accordance with the operation shown by way of a flow diagram in FIG. 15.

FIG. 4 is equivalent to FIG. [2.3] shown in the aforementioned "Tools-Unifying Method in a Software Developing Environment "Soft Becch/Encapsulator" in UNIX" (published by Yokogawa Hewlett Packard Co., Ltd. in July 1992).

When the system starts operating, an action function is set in step S1.

In the next step S2, the event to be dealt with in the system is defined by use of a function make—event.

In step S3, the construction of the GUI i.e. the object, is defined by use of a function make—manager and make—object.

In step S4, the system enters an event processing loop with display and start functions, and thereafter, processes 1, 2 and n of steps S5, S6 and Sn respectively corresponding to each event are continued by an event-driven method.

Since the conventional autonomous coordinating environment is constructed as the aforementioned application coordinating operation system, it is possible to readily monitor and control the autonomous coordinating environment from the outside. It is quite hard, however, to finely monitor and control the applications and agents actually operating and functioning in that environment directly from the outside in accordance with the external environment.

Further, if there is any information becoming newly necessary and which has not been previously provided in the agents or applications, it is impossible to add and monitor/control such information in order to monitor and control the agents and the applications in such a system.

Meanwhile, even when monitoring/controlling operations being common to a plurality of agents or applications in a system are to be executed, it is necessary to previously build in each agent application the common method necessary for the monitoring/controlling operations. This is quite inefficient and is not able to perform new monitoring/controlling operations.

Moreover, it is not possible either to join any existing application not being made to operate in an autonomous coordinating operation system to the coordinating operation likewise other agents, or to monitor and control such applications in the same manner.

In addition, for making any application already having a window-based GUI operate in an autonomous coordinating operation environment and for monitoring and controlling it, the source codes of the application must be directly changed for incorporation of a monitoring/controlling method therein. It is therefore quite inefficient to reuse the existing application in the autonomous coordinating operation system.

Further, even when a common monitoring/controlling operations must be made for a group of a plurality of agents having similar functions, similar monitoring/controlling operations must be applied to each of the agents one by one, which significantly lowers the efficiency.

Moreover, when a plurality of autonomous coordinating operation environments are mutually communicated, it is quite difficult to flexibly perform the mutual operations of the whole system without changing the policy of the monitoring/controlling operations existing in every autonomous coordinating operation environment.

As mentioned above, since the conventional system has a number of disadvantages, it has been expected to realize an agent management system which is capable of monitoring and controlling the data and action of agents operating in an autonomous coordinating operation system from an external environment.

SUMMARY OF THE INVENTION

It is therefore an object of this invention to provide a method for executing monitoring and controlling operations from an external environment of agents and a method for constituting such agents enabling such operations, in a distributed processing system comprising a single computer or a plurality of computers mutually connected via a network and agents being application objects which autonomously operate on the computers.

In view of the above object, an agent management system according to this invention comprises an agent for executing autonomous coordinating processes, first information interchanging means for interchanging information necessary for the autonomous coordinating processing of the agent to/from the agent, agent-monitor/control request means for requesting control and monitoring of the agent from outside, and second information interchanging means for interchanging information required by the agent-monitor/control request means to/from the agent by synchronous communication. Accordingly, it is possible to control the internal information of the agent through the second information interchanging means, besides the conventional autonomous coordinating operation to be carried out by the agent independently.

According to a second aspect of this invention, the agent further comprises internal information setting means for changing its own the internal information in accordance with an information change request transmitted from the second information interchanging means, and internal information acquisitior means for acquiring its own internal information in accordance with an information-acquisitior request transmitted from the second information interchanging means. Therefore, the operation to be carried out for the agent from outside becomes easier.

According to a third aspect of this invention, the agent management system further comprises additional resource data base means for holding additional information related to the agent, and additional resource access means for supporting the access of the agent to the additional resource data base. As a result, even such agents that do not have any data or method can be targets of monitoring and controlling operations.

According to a fourth aspect of this invention, the agent management system further comprises resource information setting means for setting information of the additional resource data base in accordance with an information-set request transmitted from the second information interchanging means, and resource information-acquisitior means for acquiring information of the additional resource data base in accordance with an information-acquisitior request transmitted from the second information interchanging means. As a result, even such agents that do not have any data or method can be targets of the monitoring and controlling operations.

According to a fifth aspect of this invention, the agent management system further comprises monitoring/controlling method executing means for executing methods for monitoring/controlling the agent at the processing level in reply to a request from the agent-monitor/control request means, monitoring method means for storing a monitoring method to be common in a plurality of agents and for being executed by the monitoring/controlling method executing means, and controlling method means for storing a controlling method to be common in a plurality of agents and for being executed by the monitoring/controlling method executing means. As a result, the agents can be targets of monitoring and controlling operations even if each agent has no data or method.

According to a sixth aspect of this invention, an agent management system comprises an application not prepared as an agent operating in an autonomous coordinating environment, information-reading interface means for reading information on behalf of the application, information-writing interface means for writing information on behalf of the application, first storage means for storing formats of information dependent on the application, second storage means for storing formats of information dependent on the communication of an autonomous coordinating operation system, information format converting means for converting the information format of the communication used in the application into an information format of communication used in the autonomous coordinating operation system on the basis of the information format stored in the first and the second storage means, said converting means being connected to the application through the information-reading and the information-writing interface means, an information interchanging field for interchanging information in the autonomous coordinating environment, transmitting means for transmitting information received from the application to the information interchanging field through the information format converting means, and receiving means for transmitting information received from the information interchanging field to the application through the information format converting means. Therefore, even an existing application not having been made to operate in the autonomous coordinating environment can join the autonomous coordinating operation environment as a pseudo-agent.

According to a seventh aspect of this invention, an agent management system comprises an application not having been prepared as an agent operating in an autonomous coordinating environment and having standard input/output ports, first storage means for storing an information format dependent on the application, second storage means for storing an information format dependent on communication in the autonomous coordinating environment, information format converting means for converting the information format of the communication used in the application into an information format used in the autonomous coordinating operation system on the basis of the information format stored in the first and the second storing means, said converting means being connected to the application through the information-reading interface means and the information-writing interface means, an information interchanging field for interchanging the information in the autonomous coordinating environment, transmitting means for transmitting information received from the application to the information interchanging field through the information format converting means, and receiving means for transmitting the information received from the information interchanging field to the application through the information format converting means. As a result, if existing applications just have standard input/output ports, they can readily join the autonomous coordinating operation environment as pseudo-agents.

According to an eighth aspect of this invention, an agent management system further comprises an application having an event-driven type user interface section, and the system includes event monitoring means for monitoring events between the user and the application, and an event analyzing means for analyzing the contents of the events detected by the event monitoring means and transmitting the analyzed results to the information format converting means.

Therefore, event-driven type applications such as an X window system can readily join the autonomous coordinating operation environment.

According to a ninth aspect of this invention, an agent management system further comprises event generating means for transmitting pseudo-events to the transmitting route being monitored by the event monitoring means. Accordingly, the existing applications can readily join the autonomous coordinating environment as agents without the need to be modified.

According to a tenth aspect of this invention, an agent management system further comprises group member managing means for managing agents having the same functions as group members, and access right managing means for giving the agent-accessing right to the first or the second information interchanging means in accordance with the management information from the group member managing means. As a result, it becomes easy to control the agents even when there are a lot of agents.

According to an eleventh aspect of this invention, an agent management system further comprises an information interchanging field for interchanging the information in the autonomous coordinating environment, a group-exclusive information interchanging field provided seperately from the information interchanging field and capable of being accessed just by the agents having been grouped by the group member managing means, and information delivering means for interchanging information between the information interchanging field and the group-exclusive information interchanging field. As a result, it is possible to control a number of agents by way of a group unit.

According to a twelfth aspect of this invention, an agent management system further comprises a plurality of autonomous coordinating operation environments each of which has an agent, policy managing means for managing policies of the plurality of autonomous coordinating operation environments, connected state managing means for managing the connected states of the plurality of autonomous coordinating operation environments, and inter-environments information interchanging means for interchanging the information among the autonomous coordinating operation environments in accordance with the policy managing means and the connected state managing means. As a result, it is readily possible to constitute a system by combining a plurality of distributed autonomous coordinating operation environments.

The present invention will become clear from the following description of the preferred embodiments thereof, taken in conjunction with the accompanying drawings.

DETAILED DESCRIPTION OF THE PREFERRED EMBODIMENTS

First Embodiment

Figure 1:
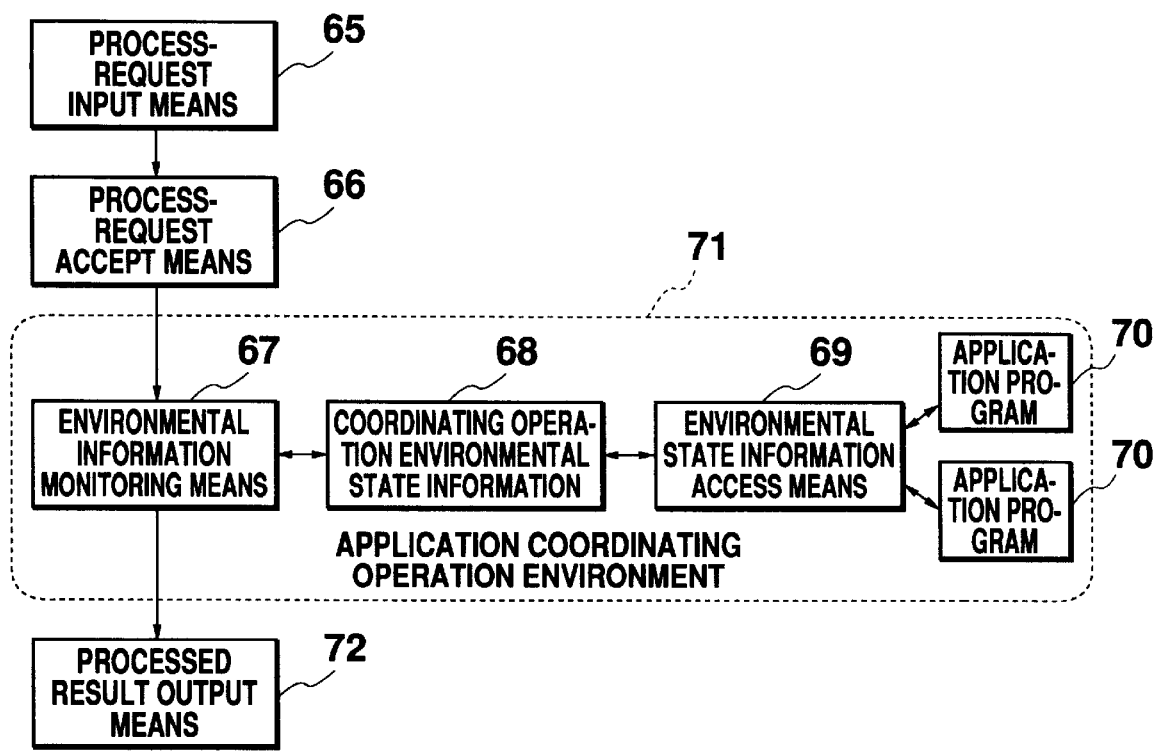
FIG. 1 is a drawing showing a composition of a conventional application coordinating mechanism.
Figure 2:
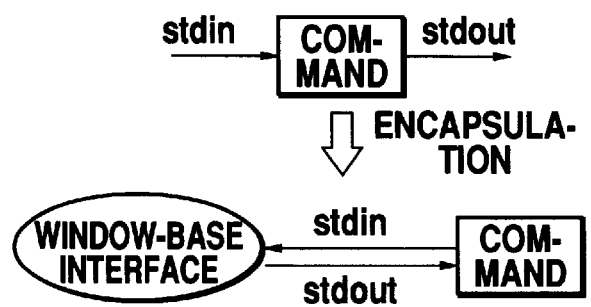
FIG. 2 is a conceptual drawing showing a conventional application encapsulating method.
Figure 3:
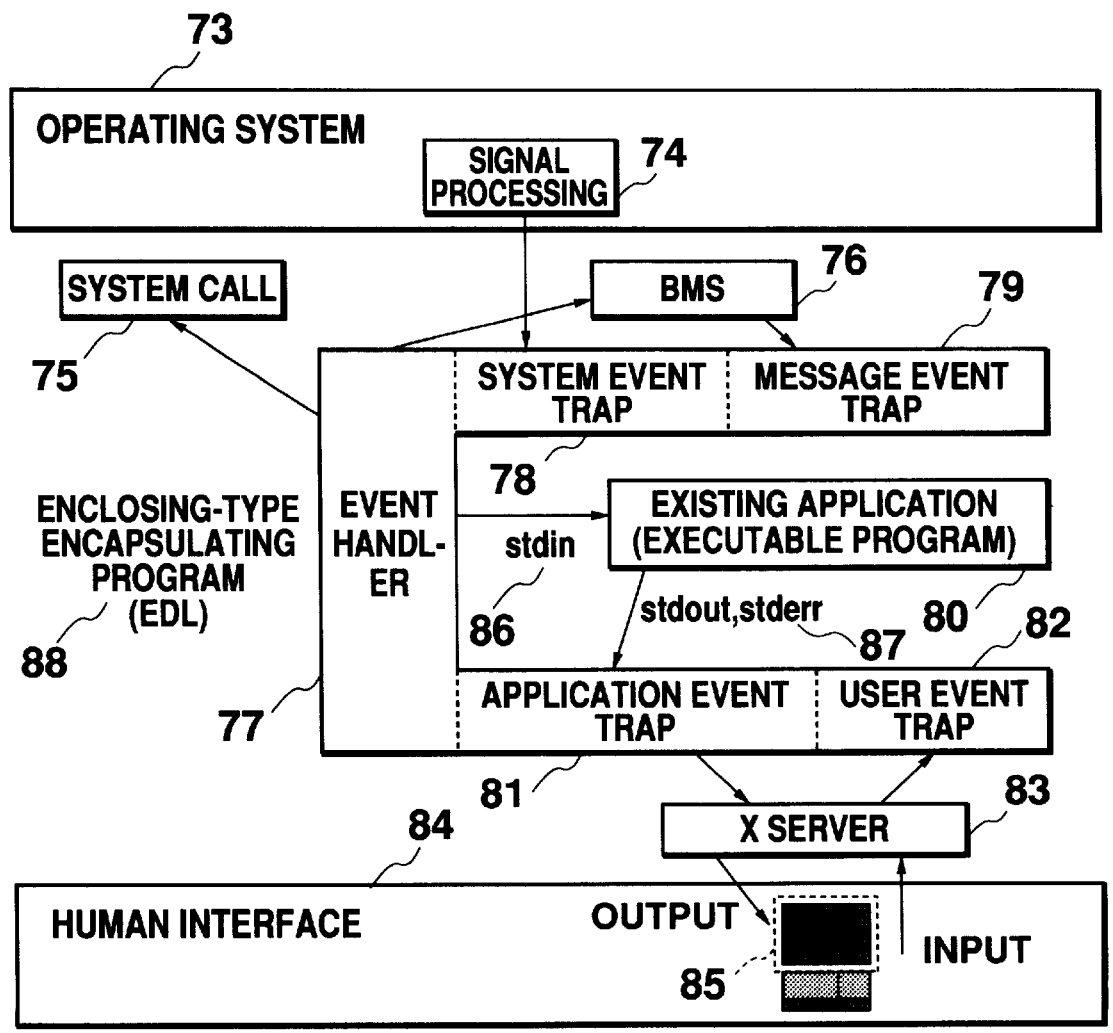
FIG. 3 is a system diagram showing a conventional method for encapsulating an application.
Figure 4:
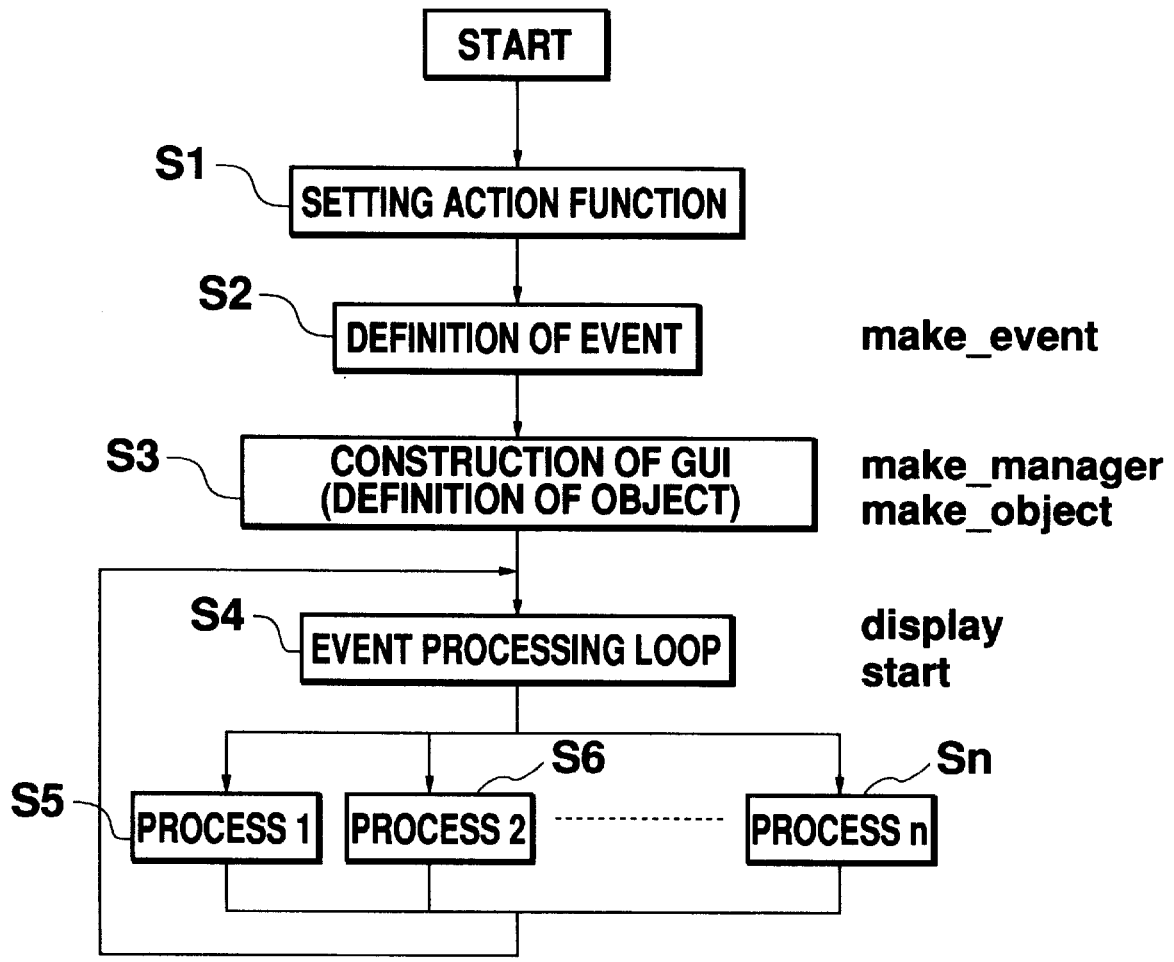
FIG. 4 is a flow diagram showing an order for producing an encapsulating program in the composition shown in FIG. 3.
Figure 5:
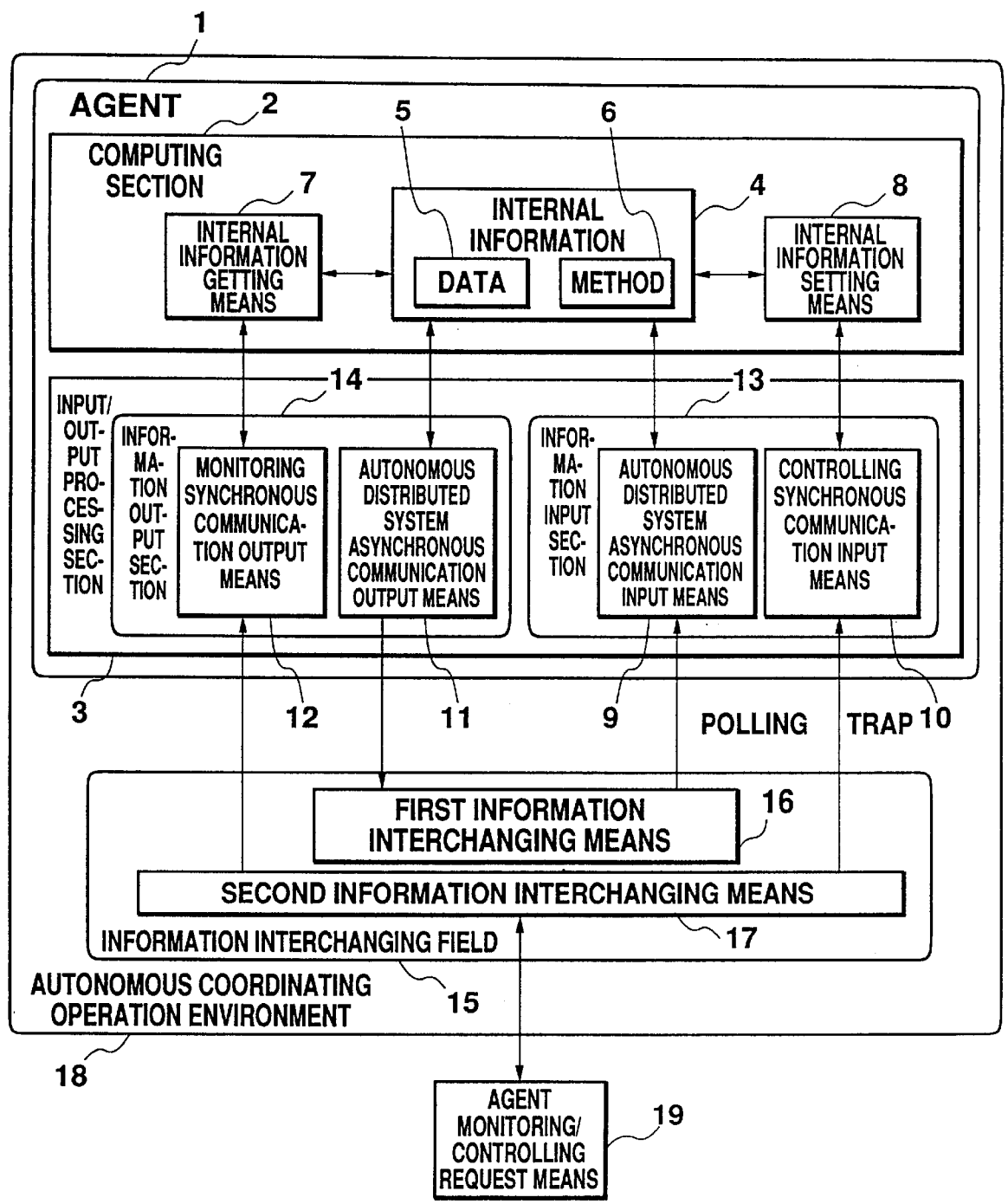
FIG. 5 is a block diagram showing an agent management system according to a first embodiment of this invention.

FIG. 5 is a block diagram showing an agent management system according to a first embodiment of this invention. In FIG. 5, the numerals designate respectively: 19, agent-monitor/control request means; 18, an autonomous coordinating operation environment including the agent 1 and an information interchanging field 15; 2, a computing section of the agent 1; 3, an input/output processing section for processing input/output information in the agent 1; 7, internal information acquisition means for acquiring internal information in the computing section 2; 4, internal information including internal data 5 and internal method 6 in the computing section 2; 8, internal information setting means for setting the internal information 4 in the computing section 2; 14, an information output section of the input/output processing section 3; 13, an information input section of the input/output processing section 3; 17, second information interchanging means, as a significant feature of this invention, for interchanging information for monitoring/controlling operations through synchronous communication in the information interchanging field 15; 16, first information interchanging means for interchanging information necessary for the autonomous coordinating processing to/from the agent through asynchronous communication; 12, second information interchanging means for interchanging information required by the agent-monitor/control request means to/from the agent through the synchronous communication; 11, autonomous distributed-system asynchronous communication output means; 9, autonomous distributed-system asynchronous communication input means for inputting information of autonomous distributed system through asynchronous communication; and 10, controlling/operating synchronous communication input means for inputting controlling and operating information through the synchronous communication. The agent-monitor/control request means 19 is connected to the second information interchanging means 17. The second information interchanging means 17 is also connected to the monitoring/operating synchronous communication output means 12 and the controlling/operating synchronous communication input means 10. The first information interchanging means 16 is connected to the autonomous distributed-system asynchronous communication output means 11 and to the autonomous distributed-system asynchronous communication input means 9. The monitoring/operating synchronous communication output means 12 is also connected to the internal information getting means 7. The autonomous distributed-asynchronous communication output means 11 is also connected to the internal data 5 of the internal information 4. The autonomous distributed-system asynchronous communication input means 9 is also connected to an internal method 6 of the internal information 4. The controlling/operating synchronous communication input means 10 is also connected to the internal information setting means 8. The internal information getting means 7 and the internal information setting means 8 are connected to the internal information 4 in the computing section 2. There are a plurality of agents 1 in the autonomous coordinating operation environment 18.

The operation of this invention will now be described.

In this embodiment, there are provided, in the information interchanging field 15, the first information interchanging means 16 for executing just asynchronous information interchange for the ordinary autonomous coordinating operation, and the second information interchanging means 17 for communicating such information as is related to synchronous interruption like monitoring and controlling operations.

The input/output operation for the ordinary autonomous coordinating operation is carried out by the autonomous distributed-system asynchronous communication input means 9 and the autonomous distributed-system asynchronous communication output means 11. On the other hand, when a monitor/control request is supplied to the second information interchange means 17 from the agent-monitor/control request means 19, this information is forcibly transmitted to the controlling/operating synchronous communication input means 10 of all the agents 1 in the autonomous coordinating operation environment 18.

The controlling/operating synchronous communication input means 10 having received the information generates an interrupt to the computing section if the information is related to itself, while it does nothing if it is irrelevant to itself.

When an interrupt is generated by the controlling/operating synchronous communication input means 10, the internal information setting means 8 changes the contents of the internal information 4, if necessary. Further, if necessary, the internal information acquisition means 7 acquires the internal information 4, which will then be transmitted to the second information interchanging means 17 through the monitoring/operating synchronous communication output means 12.

During the aforementioned processes, the information input section 13 stops the functions of the autonomous distributed asynchronous communication input means 9 to make only the controlling/operating synchronous communication input means 10 function. In the same manner, the information output section 14 stops the functions of the autonomous distributed-system asynchronous communication output means 11 to let only the monitoring/operating synchronous communication output means 12 function.

When the interrupted state caused by the controlling/operating synchronous communication input means 10 is canceled, the computing section 2 restarts the ordinary computing processes, while the autonomous distributed-system asynchronous communication input means 9 in the information input section 13 and the autonomous dispersal asynchronous communication output means 11 in the information output section 14 effectively operate.

As noted above, when a monitor or control request is supplied from the agent-control/monitor request means 19 to the second information interchanging means 17, an interrupt takes place to instantaneously change the functions of the information input section 13 and the information output section 14, so that it is possible to directly monitor and control the agent 1 from external environment.

In addition, the monitor or control request to the second information interchanging means 17 is carried out so as to be understood only by the autonomous distributed-system asynchronous communication input means 9 of the corresponding agent 1, the other agents irrelated to the monitor or control request continue to perform their ordinary functions.

Figure 6:
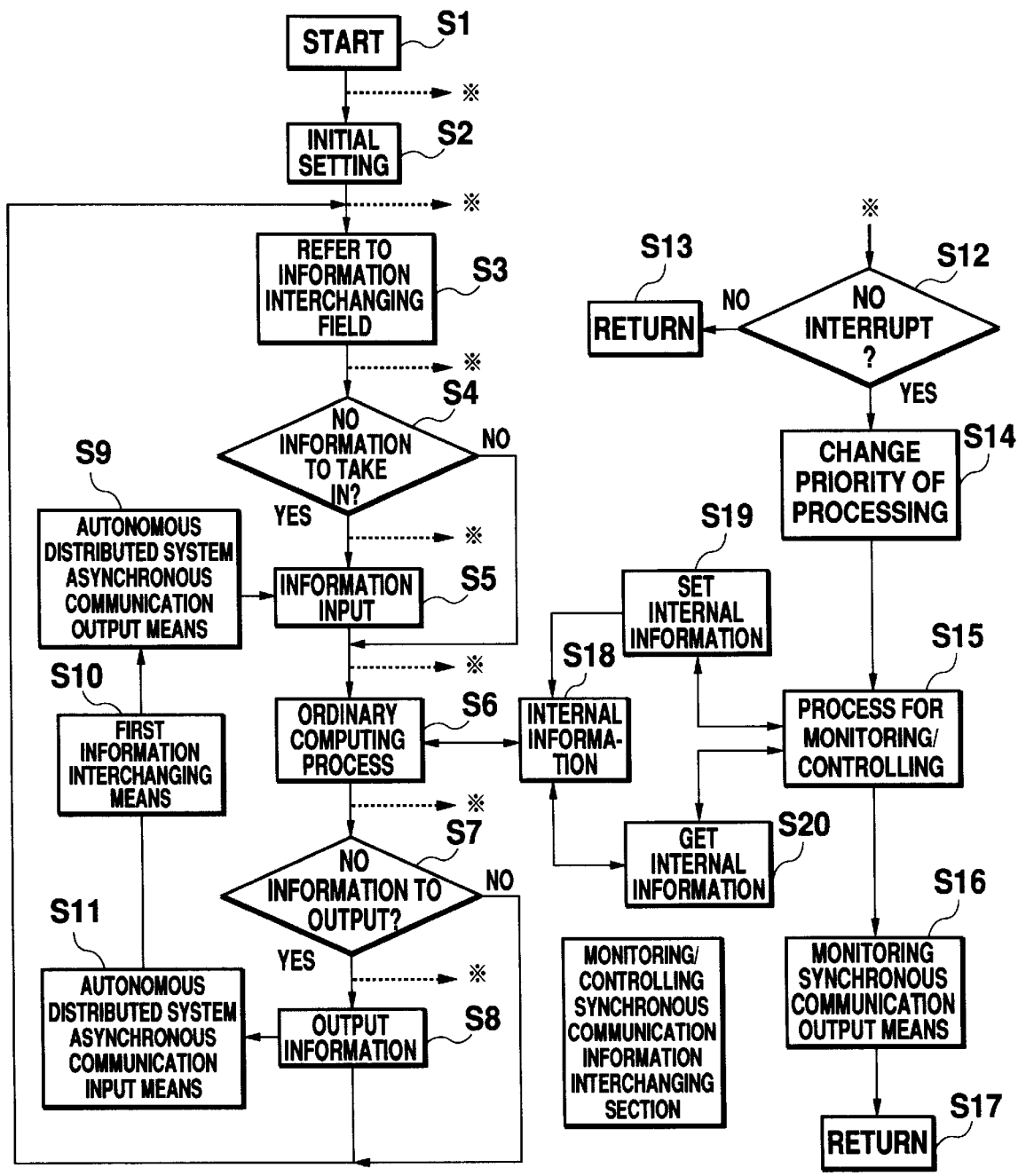
FIG. 6 is a flow diagram for explanation of the operation of the composition shown in FIG. 5.

FIG. 6 is a flow diagram for the explanation of the operation of the system shown in FIG. 5.

The system starts operating at step S1 and initial setting is made at step S2.

In step S3, the state of the first information interchanging means 16 of the information interchanging field 15 is inspected through the autonomous distributed-system synchronous communication input means 9.

In step S4, it is judged if there is any information to input through the autonomous distributed-type asynchronous communication input means 9. If the answer is negative, the operation shifts to step S6 for performing ordinary computing processes. If the answer is affirmative, the operation shifts to step S5 for inputting information via the autonomous distributed-system asynchronous communication input means 9, and then shifts to step S6 for ordinary computing processes.

Following on from the ordinary computing processes at step S6, it is judged if there is any information to be output in step S7. If the answer is negative, the operation returns to step S3, while if it is affirmative, the operation shifts to the information output in step S8.

A bus is formed from the information output of step S8 to the information input in step S5 via step S11, step S10 and step S9. In this bus, the autonomous distributed asynchronous communication input means 9 function at step S11, a first information interchanging means 16 functions at step S10, and the autonomous distributed-system asynchronous communication output means 11 function at step S9, so that the information for the asynchronous communication is interchanged for the autonomous coordinating operation.

During the aforementioned operations, when a monitor/control request is input to the second information interchanging means 17 from the agent-monitor/control request means 19, an interrupt will arise via the controlling/operating synchronous communication input means 10. Due to this interrupt, the process shifts to step S12, where it is judged if the monitor/control request is related to its own agent 1 or not. If the answer is negative, the interrupt is canceled to return to the original route via step S13.

If it is judged that the request relates to its own agent 1 in step S12, the operation shifts to step S14 to change the preferential order of the processes.

Next, shifting to step S5, the necessary processes for the monitoring and controlling operations are carried out. After completion of these processes, information for the monitoring/controlling processes is output to the second information interchanging means 17 via the monitoring/controlling synchronous communication output means 12, and then the operation shifts to the original route via step S17.

During the aforementioned processes, the second information interchanging means 17 sets the internal information setting means 8 of the computing section 2 via the controlling/operating synchronous communication input means 19, and changes the internal information 4 of the computing section at step S18, and acquires the internal information from the internal information acquisition means 7 of the computing section 2 via the monitoring/controlling synchronous communication output means 12.

Second Embodiment

Figure 7:
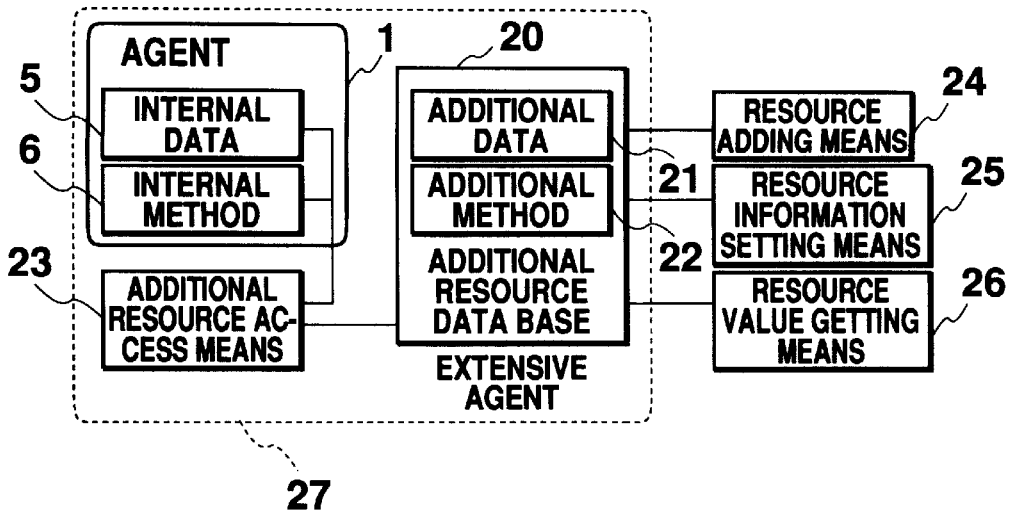
FIG. 7 is a schematic block diagram showing an agent management system according to a second embodiment of this invention.

FIG. 7 is a schematic block diagram of the agent management system according to a second embodiment of this invention. In FIG. 7, the numerals designate respectively: 20, an additional resource data base being provided with additional data 21 and an additional method 22 for providing the additional resource to the agent 1 not having data or a method; 23, an additional resource access means for accessing the additional resource data base 20 from the agent 1; 27, an extended agent including the agent 1, the additional resource access means 23 and the additional resource data base 20; 24, a resource adding means for adding resource data to the additional data 21; 25, a resource value setting means for setting a resource value to the additional method 22; and 26, a resource value acquisition means for acquiring a resource value of the additional resource data base 20.

In operation, the system according to this embodiment enables the agent 1, not previously having data or a method corresponding to the monitor and control request, to function as if it were an extended agent 27 having them. In other words, by providing the additional resource access means 23 for accessing the additional resource data base 20 storing the additional data 21 and the additional method 22 to the agent 1, it is possible to monitor or control the agent 1.

In this manner, for the extended agent 27, entries of new data or methods necessary for the monitoring and controlling operations are registered in the additional resource data base 20 by using the resource adding means 24 from outside. The values of the actual additional data 21 and additional methods 22 are set by the resource value setting means 25. These values are then taken out by the resource value getting means 26. In this manner, it is possible to monitor and control the agent 1 as the extended agent 27 without directly modifying the internal data 5 and the internal method 6 of the agent 1.

Figure 8:
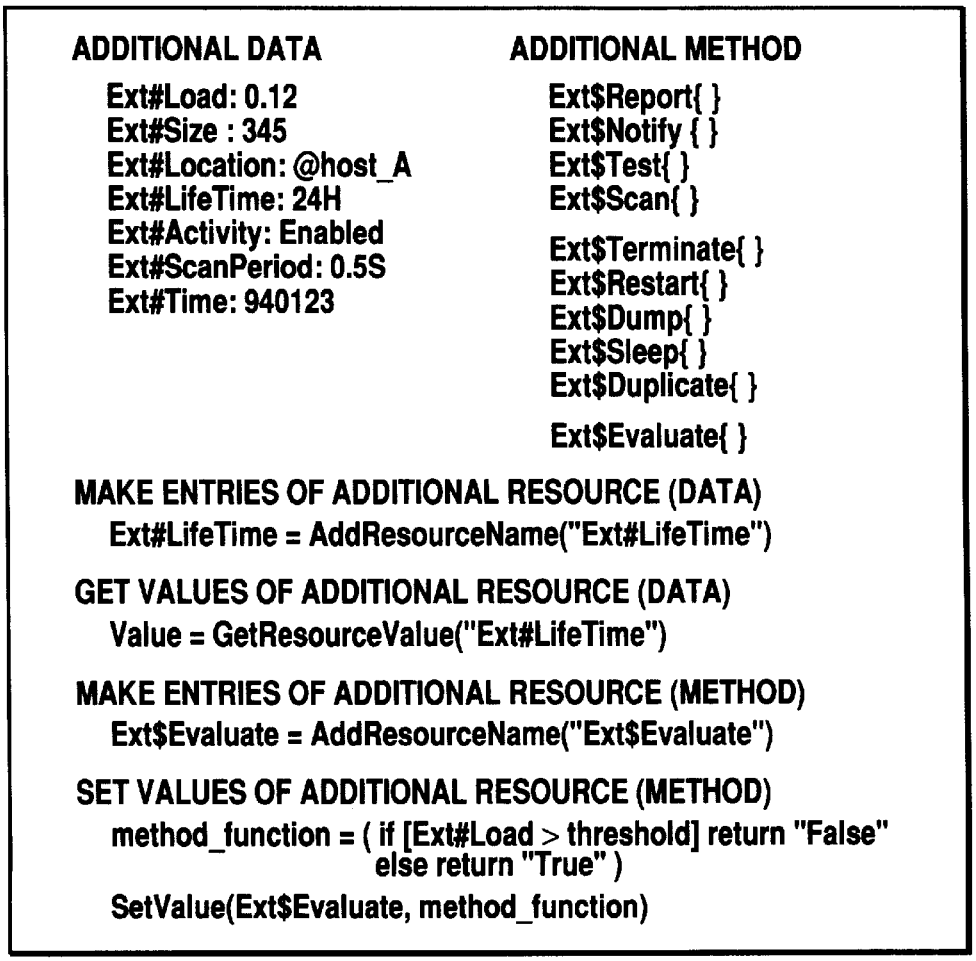
FIG. 8 is a drawing showing an example of an additional resource and a method for using it in the composition shown in FIG. 7.

FIG. 8 is an explanatory view showing an example of a resource to be added and a method for using the same in the composition of FIG. 7. In this example, qualifiers "Ext#" and "Ext$" are set to the additional data 21 and 22 respectively, so as to protect them from being confused with the internal data 5 and the internal method 6 inherent in the agent 1. The user executing the monitor and control operations can also freely issue the monitor/control request without corrupting the internal information of the agent 1.

Third Embodiment

Figure 9:
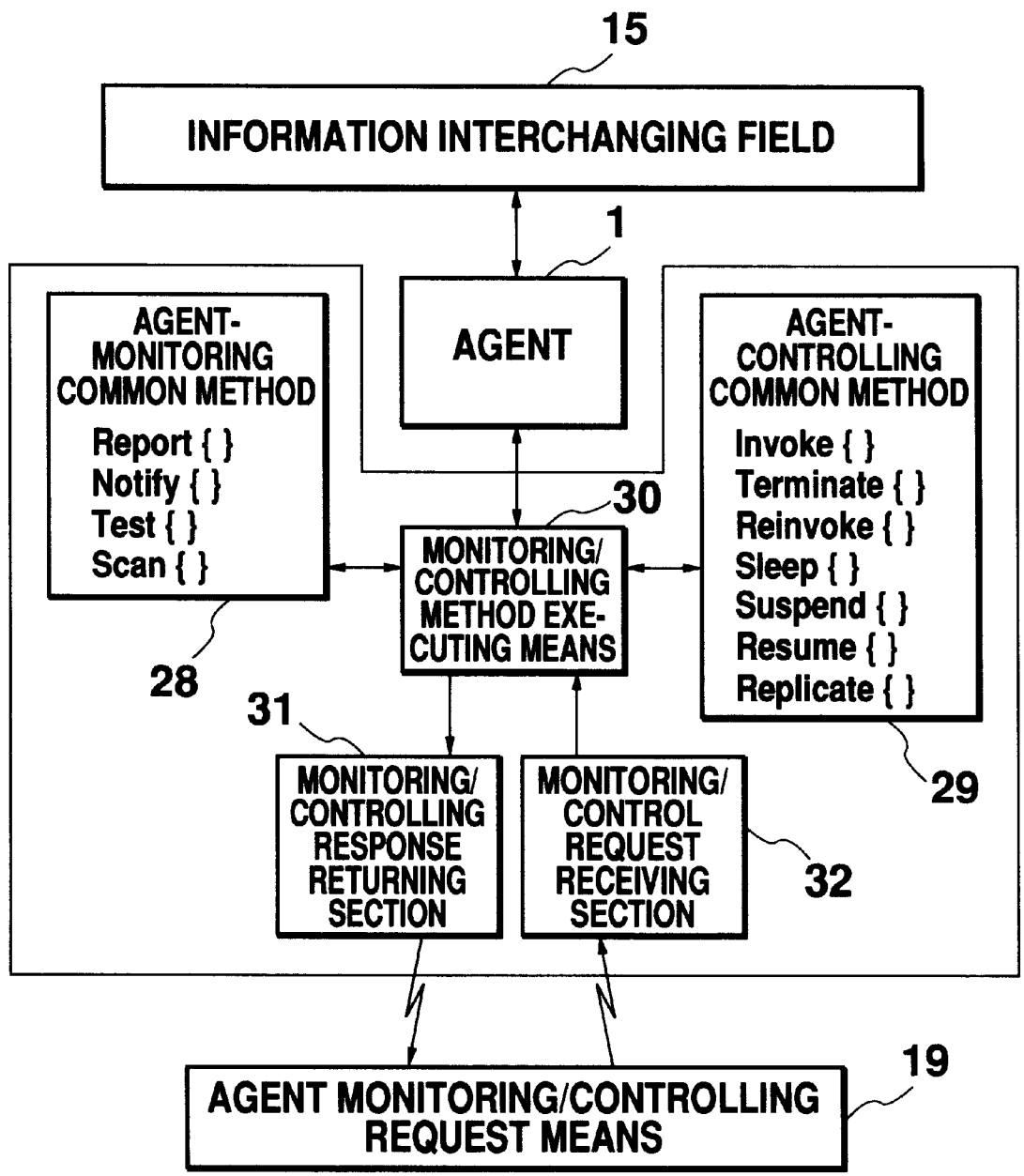
FIG. 9 is a schematic block diagram showing an agent management system according to a third embodiment of this invention.

FIG. 9 is a schematic block diagram showing an agent management system according to a third embodiment of this invention. In FIG. 9, the numerals designate respectively: 28, an agent-monitoring common method; 29, an agent-controlling common method; 30, a monitoring/controlling method executing section for executing the method of the agent-monitoring common method 28 and the agent-controlling common method 29; 31, a monitoring/controlling reply returning section for returning a controlling/monitoring reply from the monitoring/controlling method executing section 30 to the agent-monitor/control request means 19; 32, a monitor/control request receiving section for receiving the monitor/control request from the agent-monitor/control request means 19 and transferring it to the monitoring/controlling method executing section 30; 33, a monitored/controlled state-making device connected to the process of the agent 1, and including the agent-monitoring common method 28, the agent-controlling common method 29, the monitoring/controlling method executing section 30, the monitoring/controlling reply returning section 31, and a monitor/control request receiving section 32.

In operation, this embodiment has been constituted paying attention to the fact that with respect to the methods necessary for monitoring/controlling the agent 1 at a process level in most agents, the methods are usually common.

In view of such a standpoint, the common controlling method as the agent monitoring common method 28 and a common monitoring method as the agent controlling common method 29 are provided in the monitored controlling device 33. Further, there is provided a monitoring/controlling method executing section 30 connected to the monitoring/controlling reply returning section 31 and the monitor/control request receiving section 32 so that the methods can be carried out by the agent 1 from the agent controlling/monitoring request 19.

As a result, it is possible to compose a monitored/controlled state-making device 33 commonly reusable for a plurality of agents.

In the monitored/controlled state-making device 33, there is included a monitor/control request receiving section 32 for directly receiving the request from the agent-monitor/control request means 19 to let it be executed by the monitoring/controlling method executing section 30.

The executed result from the monitoring/controlling method executing section 30 is returned to the agent-control/monitor request means 19 through the monitoring/controlling reply returning section 31.

In this manner, when the agent is monitored at the process level, the monitoring/controlling operations can be quite easily executed by previously starting the agent 1 via the monitored/controlled state-making device 33.

Further, since the agent-monitoring common method 28 and the agent-controlling common method 29 are effective for the other agents, it is unnecessary to make both a monitoring method and a controlling method individually for each agent. As a result, the efficiency of the system structure can be enhanced.

The monitored/controlled state-making device 33 itself can be made as either a binary program or an interpreter process. In the latter case, the agent-monitoring common method 28 and the agent-controlling common method 29 can be held as files outside the monitored/controlled state-making device 33.

It is also possible to add any lock mechanism relating to the use in the monitored/controlled state-making device 33, and the agent-monitoring common method 28 and the agent-controlling common method 29 can be easily substituted by those of different kinds, if necessary.

Fourth Embodiment

Figure 10:
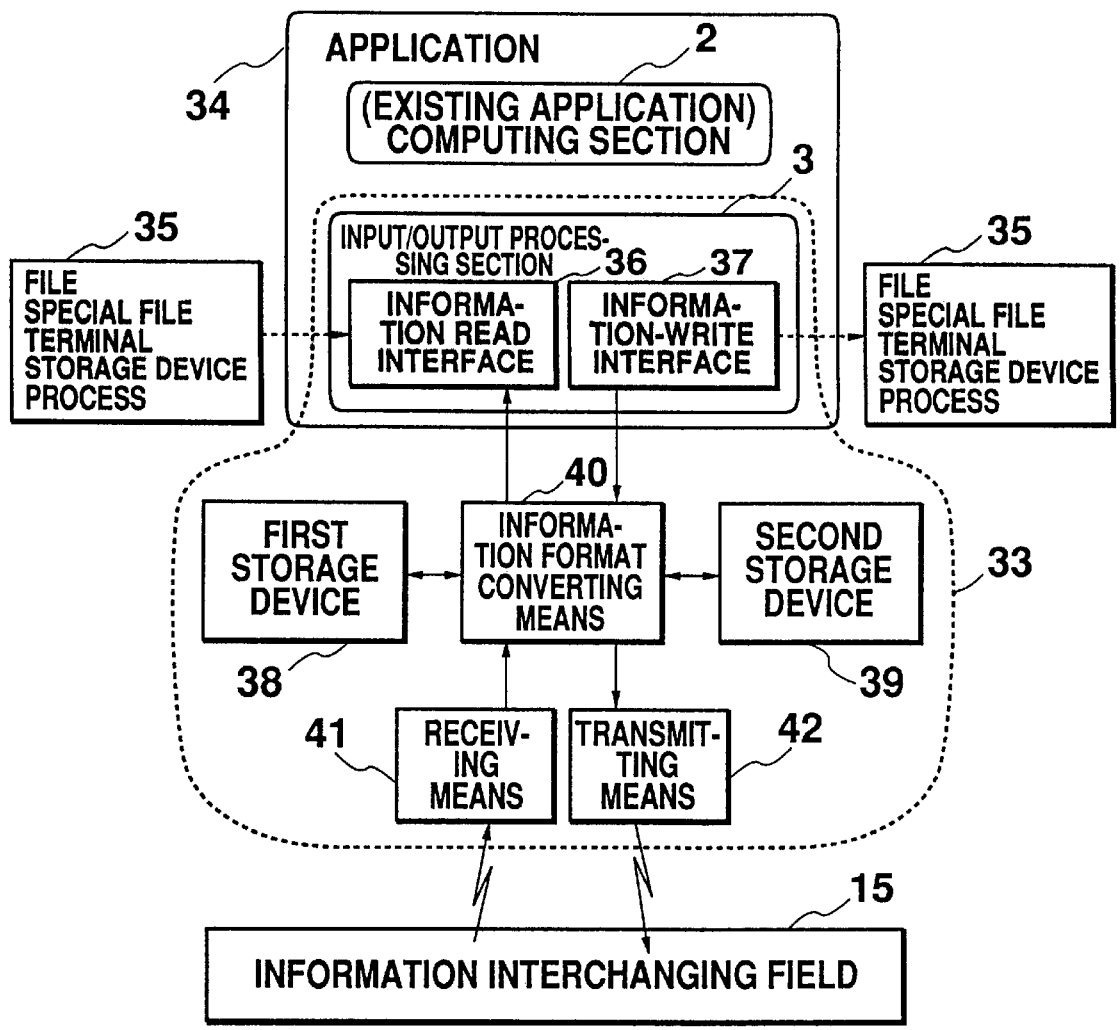
FIG. 10 is a schematic block diagram showing an agent management system according to a fourth embodiment of this invention.

FIG. 10 is a schematic block diagram of an agent management system according to a fourth embodiment of this invention. In FIG. 10, the numerals designate respectively: 34, an existing application; 35, an input/output medium such as file, special file, terminal, storage device and process etc.; 36, an information reading interface provided in the input/output processing section 3; 37, an information writing interface provided in the input/output processing section 3 for writing information in the input/output medium 35; 38, a first storage device for storing an information format dependent on the application; 39, a second storage device for storing an information format dependent on the communication in the autonomous coordinating operation system; 40, information format converting means connected to the first storage device 38 and the second storage device 39, and coupled to the existing application 34 via the information reading interface 36 and the information writing interface 37; 41, receiving means for receiving information from the information interchanging field and transmitting it to the application via the information format converting means; 42, transmitting means for transmitting information obtained from the application via the information format converting means to the information interchanging field. The monitored/controlled state-making device 33 is composed of the input/output processing section 3 of the existing application 34, the first storage device 38, the second storage device 39, the information format converting means 40, the receiving means 41, and the transmitting mean 42.

In the operation of this embodiment, the existing application 34 is recomposed to act as a pseudo-agent being capable of executing the same coordination as the other agent operating in the autonomous coordinating operation environment by replacing only the information reading interface 36 and the information writing interface 37 of the input/output processing section 3 of the existing application 34 which is not constituted as an agent operating in the autonomous coordinating environment.

The information being put in the information interchanging field 15 is received by the receiving means 41 and is then transferred to the information format converting means 40. On the other hand, the information from the existing application 34 side is then supplied to the information interchanging field 15 passing the information format converting means 40 via the transmitting means 42.

Meanwhile, the existing application 34 is generally read from the input/output medium such as file, special file, terminals, storage device, or other processes via the information reading interface 36, and is then written in the input/output medium 35 via the information writing interface 37.

Further, the information format dealt with in the input/output processing section 3 of the existing application 34 is stored in the first storage device 38, while the information format related to the information interchange executed in the autonomous coordinating communication system is stored in the second storage device 39. The information format converting means 40 carries out the information format conversion between the existing application 34 and the information interchanging field 15 by searching the first storage device 38 and the second storage device 39, so as to absorb the difference of autonomous coordinating communication system-dependent data format.

According to the above-mentioned structure, the existing application 34 can take part in the coordinating operation in the autonomous coordinating operation system as a pseudo-agent 1 just by exchanging the input/output processing section 3 with the computing section 2 left intact.

The information reading interface 36 and the information writing interface 37 can be prepared as a library, so that the existing application 34 can be reconstructed as the agent 1 by just once again linking the new information reading interface 36 and the information writing interface 37 to a proposed common library, without needing to modify the source code of the existing application 34.

Further, if the library is a shared library form to be dynamically linked when the application is executed, there is no need to link again, so that the existing application 34 can be composed as a pseudo-agent, thereby enhancing the efficiency of the system construction.

Fifth Embodiment

In this embodiment, the system described in the fourth embodiment is applied to an application in accordance with a pipeline model in the simplest UNIX operating system.

Figure 11:
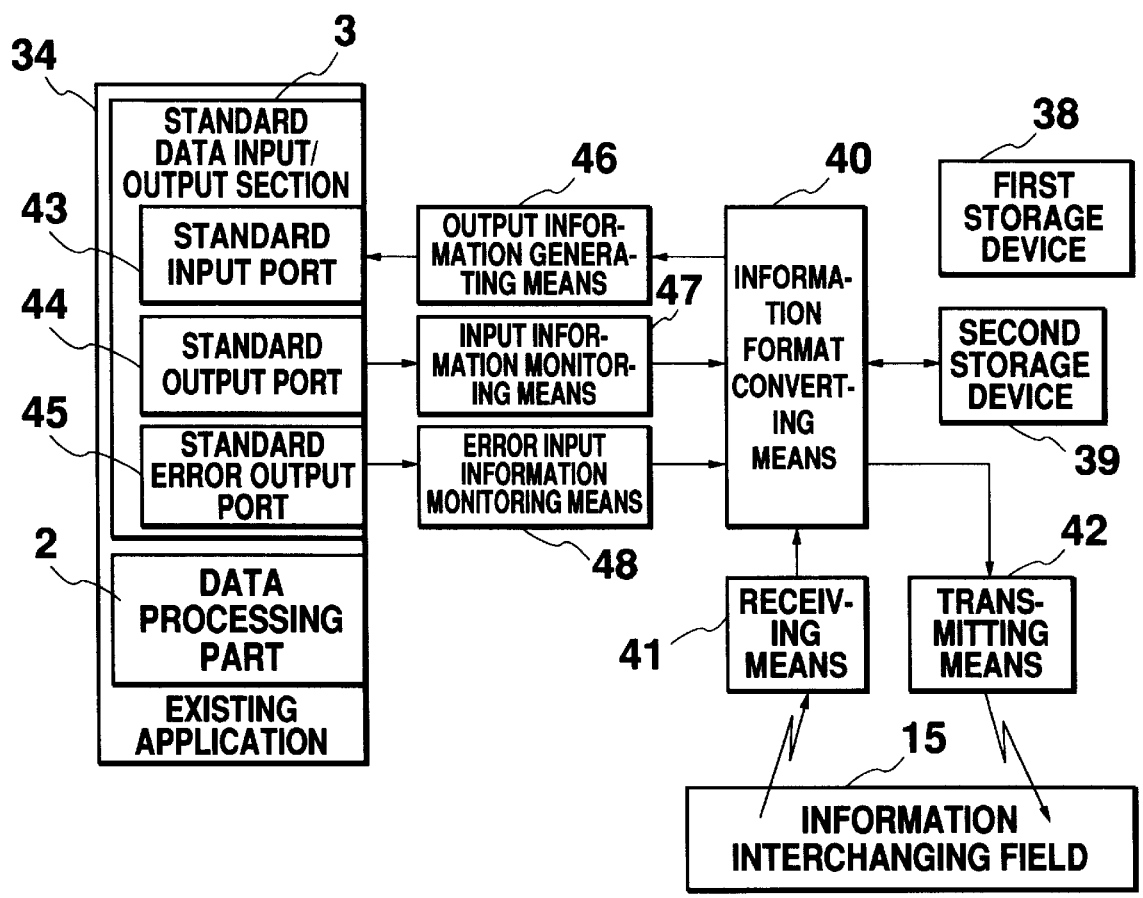
FIG. 11 is a schematic block diagram showing an agent management system according to a fifth embodiment of this invention.

FIG. 11 is a schematic block diagram of an agent management system according to a fifth embodiment of this invention. In FIG. 5, the numerals designate respectively: 43, a standard input port at an input/output portion of standard data of the input/output processing section 3 of the existing application 34; 44, a standard output port; 45, a standard error output port. In the computing section 2 of the existing application 34, the data processing section is located. In the same manner, the numerals designate respectively: 46, output information producing means for connecting the standard input port 43 to the information format converting means 40; 47, input information monitoring means for connecting the standard output port 44 to the information format converting means 40; 48, an error input information monitoring means for connecting the standard error output port 45 to the information format converting means 40.

In operation, the existing application 34 reads its information input from the standard input port 43 and writes the information output to the standard output port 44, and outputs the error output to the standard error output port 45. The input/output of information to these ports are controlled by the output information producing means 46, the input information monitoring means 47, and the error input information monitoring means 48.

On the other hand, the information format converting means 40 searches for the information format dependent on the application from entries in the first storage device 38, while it searches for the autonomous coordinating communication-dependent information format from entries in the second storage device 39, and by converting each information format it enables the existing application 34 to take part in the autonomous coordinating communication system.

Although the output information producing means 46, the input information monitoring means 47, and the error input information monitoring means 48 are directed to the standard input port 43, the standard output port 44, and the standard error output port 45, respectively, these ports can be replaced with for example socket ports of a network interface or special file of UNIX.

Accordingly, any application having any input/output interface can be reconstructed as an agent by applying the same system construction.

Sixth Embodiment

Figure 12:
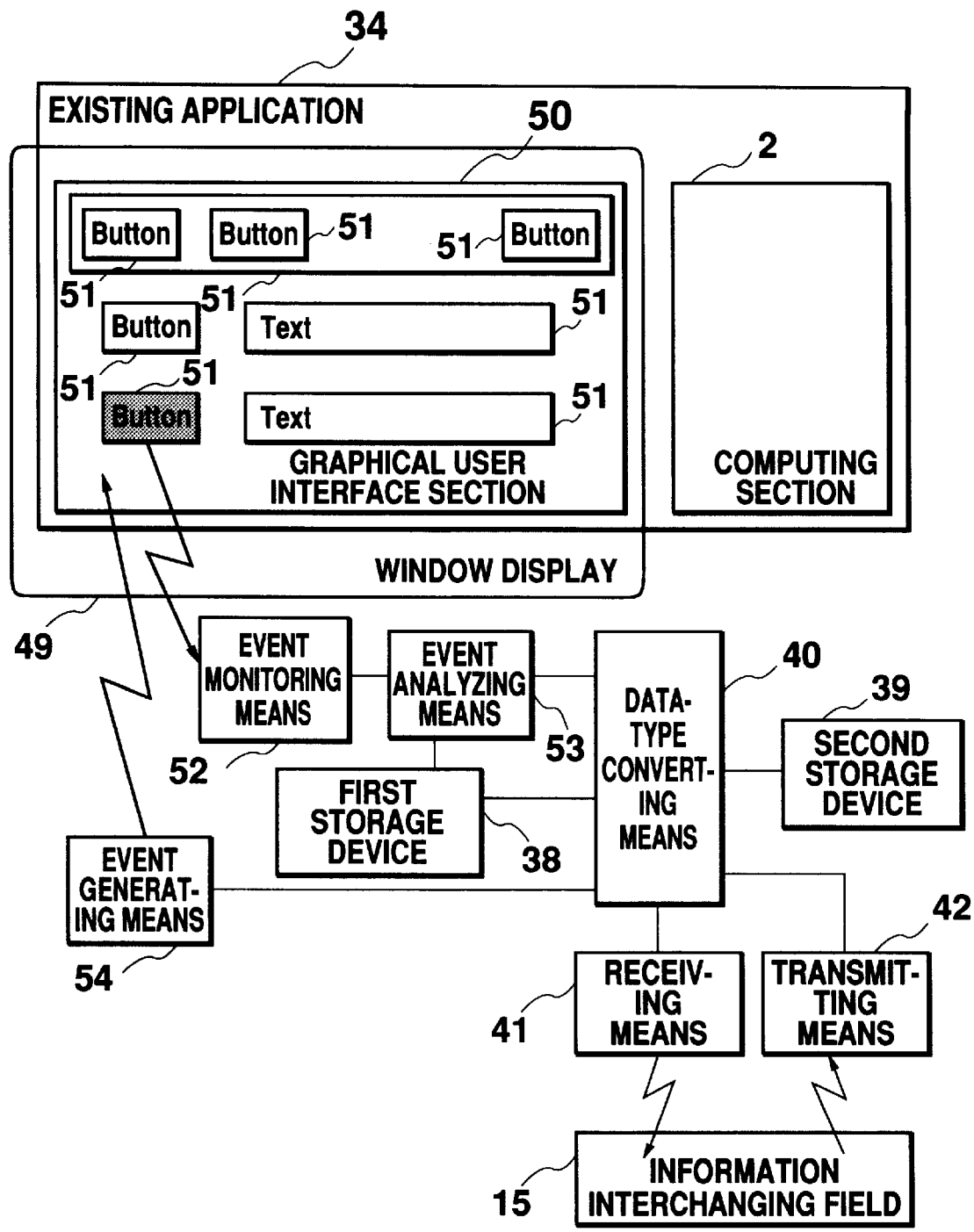
FIG. 12 is a schematic block diagram showing an agent management system according to a sixth embodiment of this invention.

FIG. 12 is a schematic block diagram of an agent controlling system according to a sixth embodiment of this invention. In FIG. 12, the numerals designate respectively: 49, a window display; 50, a graphical user interface section of an existing application 34; 51, window-composing parts such as buttons or text in the graphical user interface section 50; 52, an event monitor means for monitoring events at the graphical user interface section 50; 53, an event analyzing means for analyzing the monitored result in the event monitoring means 52; and 54, an event generating means for generating event in the graphical user interface section 50.

In operation of the system in this embodiment, the existing application 34 has an event-driven type graphical user interface section 50, a typical of which is the X window system, for transferring information to/from the user. Even if this application 34 is not constructed as an agent operating in an autonomous coordinating operation environment, it can be operated in the autonomous coordinating operation system.

The existing application 34 is mainly composed of the computing section 2 for processing the application itself and a graphical user interface for transferring data to/from the user. The graphical user interface section 50 displays the window-constructing parts 51 on the window display 49. The information from the user is input from the window-constructing parts 51 and is then transferred to the computing section 2 via the window display 49. The information to be transferred to the user is inversely displayed on the window-constructing part 51 via the window display 49.

In the case of the X window system, the window display 49 corresponds to the X server. Events from the window constructing part 51 or events to the window constructing part 51 are always transmitted through the window display 49. The event monitoring means 52 monitors the events between the window constructing part 51 and the window display 49 normally via a particular communication path, and transmits the received information to the event analyzing means 53.

The event analyzing means 53 analyzes the meaning of the event by searching the first storage device 38 previously storing the event information generated by the graphical user interface section 50 of the existing application 34.

The information format converting means 40 accesses the second storage device 39 to convert the information format, and transmits it to the information interchanging field 15 via the transmitting means 42.

In contrast, the information in the information interchanging field 15 is received by the receiving means 41 and is then passed to the information format converting means 40 for conversion of the information format, so as to be supplied to the event generating means 54.

The event generating means 54 processes the information for the communication path being monitored by the event monitoring means 52 as if that event is generated by the window constructing part 51, and then outputs it.

Through the aforementioned processes, the existing application 34 is treated as a pseudo-agent so as to be capable of joining the coordinating operation in the autonomous coordinating communication system.

In this embodiment, in the case of the existing application already having a GUI, a series of events generated by the GUI are obtained only by monitoring the communication path of the window display 49, so that it can be treated as an agent without applying any modification to the existing application 34.

For analyzing the meaning of the series of events, an effective way is to execute the series of operations of the existing application 34 once as dummy, the information is then analyzed via the event monitoring means 52 and the event analyzing means 53, and the analyzed results are previously registered in the application-dependent information format storage device 38.

Seventh Embodiment

Figure 13:
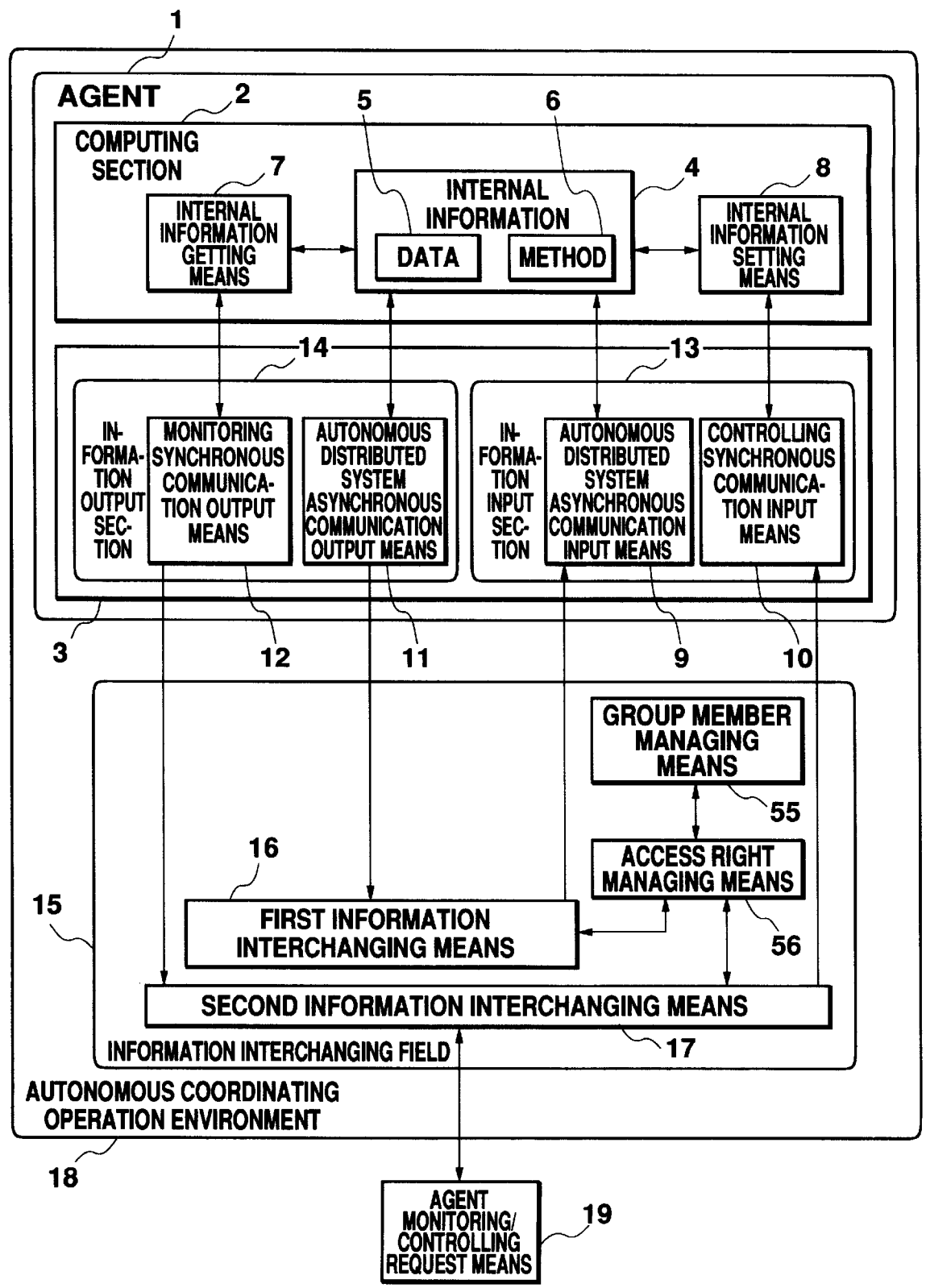
FIG. 13 is a block diagram showing an agent management system according to a seventh embodiment of this invention.

FIG. 13 is a block diagram showing an agent management system of the seventh embodiment. In FIG. 13, the numerals designate respectively: 55, group member managing means, 56, access right managing means for managing the access right in the first information interchanging means 16 and the second information interchanging means 17.

In the operation of this embodiment, for unifying a plurality of agents 1 for executing mutually similar monitoring controlling as one group, the group member managing means 55 is provided in the information interchanging field 15 for controlling information of one or a plurality of agents 1 belonging to a certain group. Each agent 1 is restricted by the access right managing means 56 for determining if it is possible to access the information in that field on the basis of the information from the group member managing means 5 at the time of accessing the information in the information interchanging field 15, it can access only the information belonging to the group that it belongs.

In such a system, by composing a plurality of agents 1 as a group and executing monitoring/controlling by that group, even in a system in which the number of agent 1 significantly enlarges, it is possible to effectively monitor and control a lot of agents 1.

This group managing operation can, of course, control a plurality of groups as one group, as a result of which, agents which belong to a plurality of categories can be monitored or controlled in an hierarchical manner for each function.

Eighth Embodiment

Figure 14:
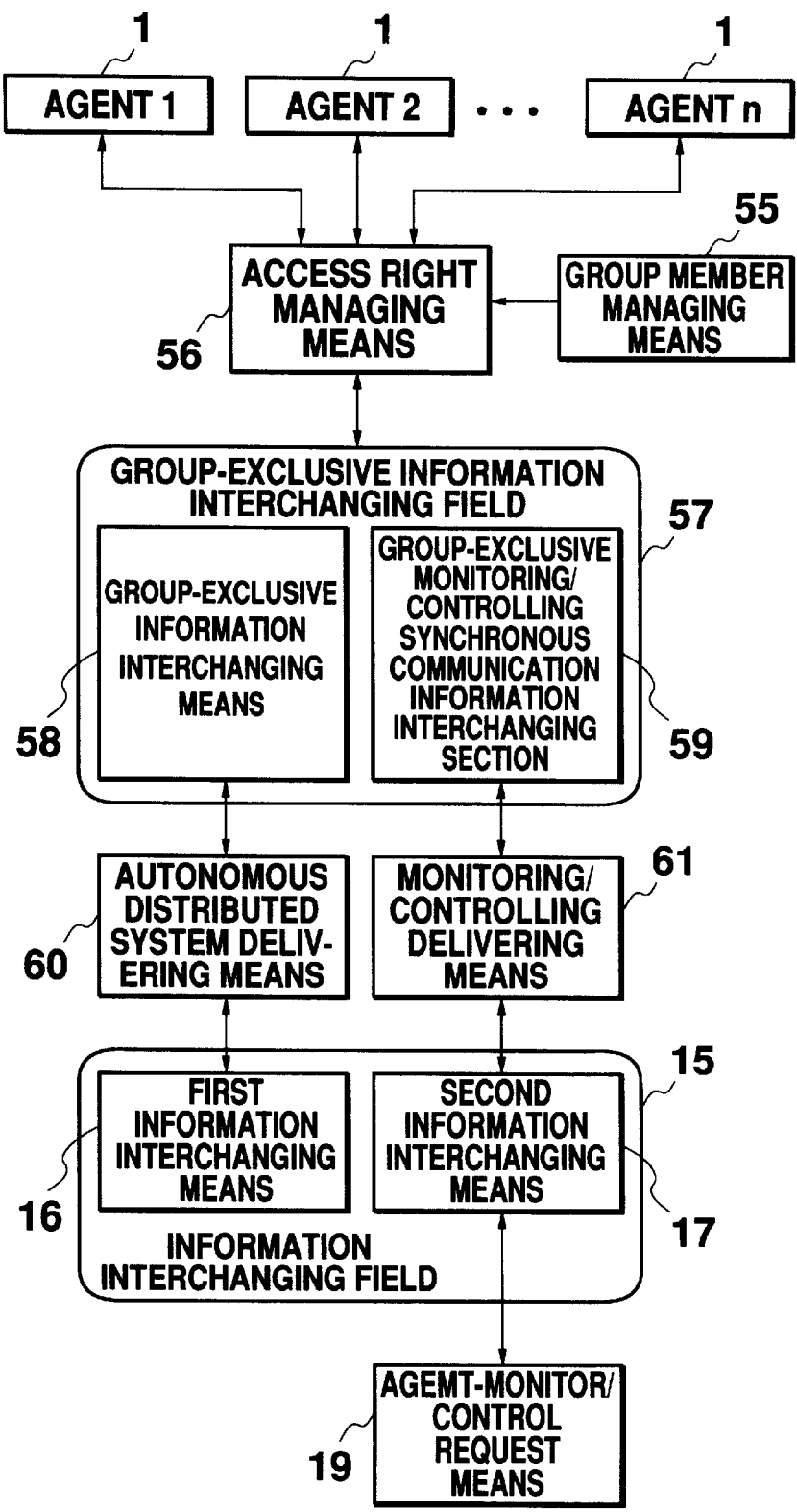
FIG. 14 is a schematic block diagram showing an agent management system according to an eighth embodiment of this invention.

FIG. 14 is a schematic block diagram of an agent management system of an eighth embodiment of this invention. In FIG. 14, the numerals designate respectively: 57, a group-exclusive information interchanging field; 58, group-exclusive autonomous coordination information interchanging means; 59, a group-exclusive controlling/monitoring synchronous communication information interchanging section of the group exclusive autonomous coordination information interchanging field 57; 60, delivery means for autonomous distribution which connects the first information interchanging means to the group-exclusive information interchanging means 58; 61, delivery means for monitoring/controlling operations which connects the information interchanging field to the group-exclusive monitoring/controlling synchronous communication information interchanging section 59.

The operation of this embodiment will now be described.

In this embodiment, there is provided, outside the normal information interchanging field 15, a group-exclusive autonomous coordination information interchanging field 57 which can be accessed only by a plurality of grouped agents 1. The access-right managing means 56 having obtained information from the group member managing means 55 for managing the group information allots the information interchanging field to be a target of access by the group member managing means 55 for managing the group information to the group-exclusive autonomous coordination information interchanging field 57. As a result, it is possible to execute common monitoring and controlling operation for a plurality of agents 1 belonging to the same group.

Among information in the second information interchanging section 16 existing in the normal information interchanging field 15, only the information related to the corresponding group is transferred to the group-exclusive information interchanging means 58. Among the information in the monitoring controlling synchronous communication information interchanging section 17 existing in the normal autonomous coordinating communication information interchanging field 15, only the information related to the corresponding group is transferred to the group-exclusive controlling synchronous communication information interchanging section 59 by the delivery means 61.

The consistency of information between the information interchanging field 15 and the group-exclusive monitoring/controlling synchronous communication information interchanging field 59 is assured by delivering means 61 and the inter-environmental information interchanging means 62.

Ninth Embodiment

Figure 15:
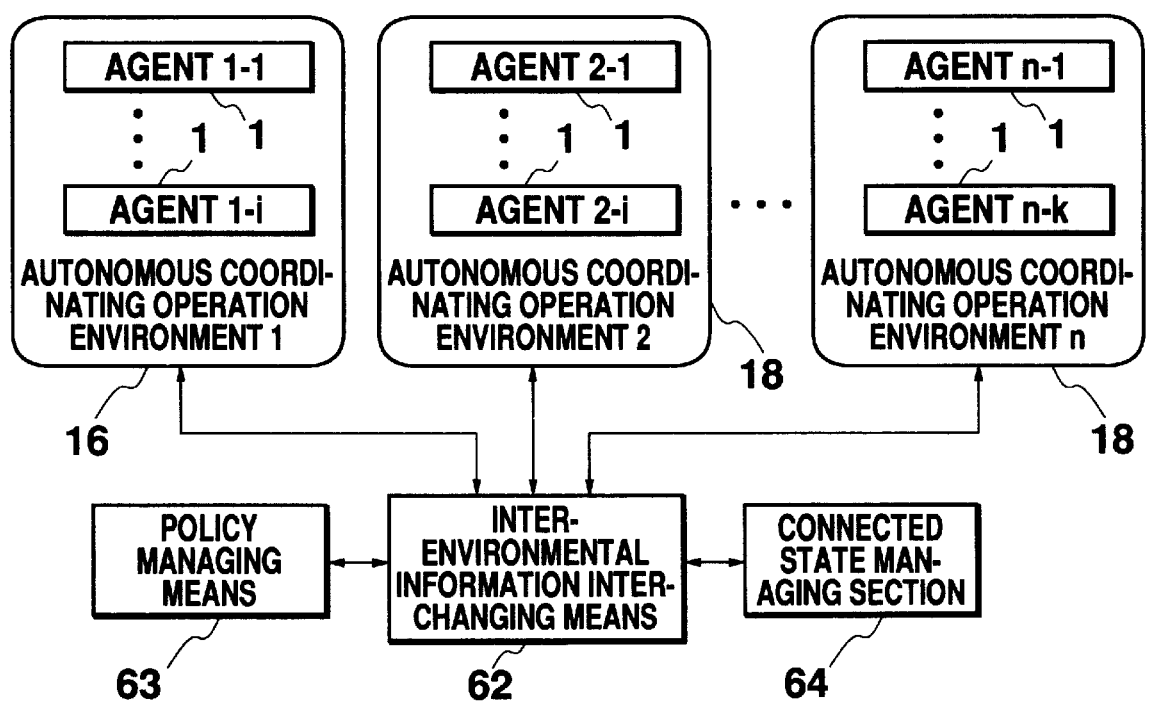
FIG. 15 is a schematic block diagram showing an agent management system according to a ninth embodiment of this invention.

FIG. 15 is a schematic block diagram showing an agent controlling system according to a ninth embodiment of this invention. In FIG. 15, the numerals designate respectively: 62, inter-environmental information interchanging means for interchanging information between the autonomous coordinating operation environments in accordance with policy managing means 63 and connected state-managing means 64; 63, policy managing means for managing policies of a plurality of autonomous coordinating operation environments; 64, a connected state-managing section for managing connected states of a plurality of autonomous coordinating operation environments. The code [1] of the autonomous coordinating operation environment 18 corresponds to [1-1]-[1-i] of the agent 1, [2] corresponds to [2-1]- [2-j], and [n] corresponds to [1-1]-[n-k] of the agent 1.

With the aforementioned composition, the operation will now be described.

In this embodiment, for constructing a system by combining several dispersed autonomous coordinating operation environments 18, controlling policy of the environment existing in each autonomous coordinating operation environment 18 is recognized by the policy managing means 63, and the connecting state at each time point is recognized by the connected state-managing section 64.

For mutually connecting these plurality of autonomous coordinating operation environments 18, the inter-environment information interchanging means 62 firstly references the policy managing means 63 and the connected state-managing section 64, and then executes the information interchanging transference between the environments to such an extent as to not mutually invade the individual policy.

According to the system as constructed above, even a request for monitoring and controlling is issued, if that operation invades the policy of the respective autonomous coordinating operation environment 18, the information would not be transferred. As a result, it is possible to flexibly cope with such subjects as assurance of security, or charging depending on the information amount.

As described in the embodiments, the agent controlling system according to this invention is composed to surely and flexibly execute coercive controlling and monitoring operations from external environments from automatically operating agents, so that the efficiency of the system construction can be enhanced by the reuse of the agent monitoring/controlling mechanism.

Furthermore, it is also possible to make the existing application not being composed as an agent operating in the autonomous coordinating environment act as a similar coordinating operation to the other autonomous agents, such that existing applications can be reused in the autonomous coordinating operation environment, so as to further improve the efficiency of the system construction.

On the other hand, it is also possible to efficiently perform the monitoring and controlling operation for large-scaled complex systems having a lot of agents to be the target of the controlling and monitoring operation.

In addition, when a plurality of autonomous coordinating operation environments are combined to construct a system, it is possible to execute the controlling and monitoring operation for the entire system so as not to mutually invade the controlling policy existing in each of the autonomous coordinating operation environments.

What is claimed is:

1. An agent management system comprising:
   a plurality of agents, each for performing an autonomous coordinating process within an autonomous coordinating operation environment;
   first information interchanging means associated with each said agent within said autonomous coordinating operation environment for interchanging information necessary for the autonomous coordinating process of said agent by asynchronous communication to/from said agent;
   agent-monitor/control request means external to and associated with said plurality of agents for requesting monitoring or controlling of said plurality of agents from an external environment external to said autonomous coordinating operation environment;
   second information interchanging means associated with each said agent within said autonomous coordinating operation environment for interchanging necessary information requested by said agent monitor/control request means by synchronous communication to/from said plurality of agents within said agent management system; and said first information interchanging means suspending the asynchronous communication to/from said agents while said second information interchanging means synchronously communicates to/from said agents so that said agent-monitor/control request means can directly monitor and control said agents from the external environment.

2. An agent management system according to claim 1, wherein said agent further comprises:

internal information setting means for changing self-internal information in accordance with an information change request transmitted from said second information interchanging means; and an internal information acquisition means for acquiring self-internal information in accordance with an information acquisition request transmitted from said second information interchanging means.

3. An agent management means according to claim 1, wherein said system further comprises:

additional resource data base means for holding additional information related to said agent; and additional resource access means for supporting an access to said additional resource data base by said agent.

4. An agent management system according to claim 3, wherein said system further comprises:

resource information setting means for setting information of said additional resource data base in accordance with an information setting request transmitted from said second information interchanging means; and resource information acquisition means for acquiring information of said additional resource data base in accordance with an information acquisition request transmitted from said second information interchanging means.

5. An agent management system according to claim 1, wherein said system further comprises:

monitoring/controlling method executing means for executing method for monitoring/controlling said agent at a process level in accordance with a request from said agent-monitor/control request means;

monitoring method means for storing a monitoring method being common for a plurality of agents and being executed by said monitoring/controlling method executing means; and controlling method means for storing a controlling method being common for a plurality of agents and being executed by said monitoring/controlling method executing means.

6. An agent management system comprising:

a plurality of applications each not being composed as an agent which operates in an autonomous coordinating environment;

information-reading interface means associated with each application for acting as an information reading process of said application;

information-writing interface means associated with each application for acting as an information writing process of said application;

first storage means associated with each application for storing an information format dependent on said application;

second storage means associated with each application for storing an information format dependent on a communication in the autonomous coordinating operation system;

information format converting means associated with each application for converting the information format of communication to be used in said application into an information format of communication to be used in the autonomous coordinating operation system, based on the information format stored in said first and second storage means, said converting means being connected to said application through said information-reading interface means and said information-writing interface means;

an information interchanging field external to and associated to said plurality of applications wherein the information is mutually interchanged in an autonomous coordinating environment;

transmitting means associated with each application for transmitting information obtained from said application through said information format converting means to said information interchanging field;

receiving means associated with each application for receiving the information from said information interchanging field and transferring it to said application through said information format converting means; and joining means for joining existing applications not composed as agents which operate in an autonomous coordination environment as a plurality of pseudo-agents.

7. An agent management system comprising:

a plurality of applications not being composed as an agent each of which operates in an autonomous coordinating environment;

standard input/output and error output ports associated with each application;

first storage means associated with each application for storing an information format dependent on said application;

second storage means associated with each application for storing an information format dependent on the communication in the autonomous coordinating operating system;

information format converting means associated with each application for converting, the information format of communication used in said application into an information format of communication used in the autonomous coordinating operation system, based on the information stored in said first and second storage means, said information format converting means being connected to each application through an information-reading interface means and an information-writing interface means;

an information interchanging field external to and associated with said plurality of applications where the information is mutually interchanged in the autonomous coordinating environment;

transmitting means associated with each application for transmitting the information obtained from said application through said information format converting means to said information interchanging field;

receiving means associated with each application for receiving the information from said information interchanging field to said application through said information format converting means; and joining means for joining existing applications not composed as agents which operate in an autonomous coordinating environment as a plurality of pseudo-agents, wherein the existing applications only include standard input/output and error output parts.

8. An agent management system according to claim 7, wherein said application has an event-driven user interface;

said system further comprising:

event monitoring means for monitoring an event between a user and said application;

event analyzing means for analyzing the contents of the event detected by said event monitoring means and transmitting the analyzed results to said information format converting means.

9. An agent management system according to claim 8, wherein said system further comprises:

event generating means for generating a pseudo-event and transmitting it to communication paths being monitored by said event monitoring means.

10. An agent management system according to claim 1, wherein said system further comprises:

group member managing means for managing agents having the same function as group members; and access-right managing means for giving a right for accessing to said agent to said first or second information interchanging means in accordance with the managing information from said group member managing means.

11. An agent management system according to claim 10, wherein said system further comprises:

an information interchanging field for interchanging information in autonomous coordinating environment;

a group-exclusive information interchanging field being provided separately from said information interchanging field and being accessible only by an agent being a member of the group defined by said group member managing means; and information delivering means for interchanging information between said information interchanging field and said group-exclusive information interchanging field.

12. An agent management system comprising:

a plurality of autonomous coordinating operation environments, each of which includes an agent;

a policy managing means external to and associated with said plurality of autonomous coordinating operation environments for managing policies of said plurality of autonomous coordinating operation environments;

a connecting state managing means external to and associated with said plurality of autonomous coordinating operation environments for managing connecting states of said plurality of autonomous coordinating operation environments at discrete time intervals; and an inter-environmental information interchanging means external to and associated with said plurality of autonomous coordinating operation environments for interchanging information among said plurality of autonomous coordinating operation environments in accordance with said policy managing means and said connecting sate managing means; wherein said inter-environmental information interchanging means will not transfer information to an autonomous coordinating operation environment, when the information violates a policy of the autonomous coordinating environment.

* * * * *